INVENTORS
DAVID W. BUTLER
EDWIN L. HOBART
BY Semmes and Semmes
ATTORNEYS

Sept. 8, 1970     D. W. BUTLER ET AL     3,527,324
TRAILER COUPLING SURGE BRAKE MECHANISM
Filed Jan. 2, 1969     2 Sheets-Sheet 2

INVENTORS
DAVID W. BUTLER
EDWIN L. HOBART
BY *Semmes and Semmes*
ATTORNEYS

United States Patent Office 3,527,324
Patented Sept. 8, 1970

3,527,324
TRAILER COUPLING SURGE BRAKE MECHANISM
David W. Butler, Scottsdale, and Edwin L. Hobart, Mesa, Ariz., assignors to Arcoa, Inc., Phoenix, Ariz., a corporation of Oregon
Filed Jan. 2, 1969, Ser. No. 788,528
Int. Cl. B60t 7/20
U.S. Cl. 188—112                         3 Claims

ABSTRACT OF THE DISCLOSURE

Trailer couplings, particularly a surge brake construction mounted upon the coupling which applies the trailer brakes through a master hydraulic cylinder, as deceleration of the towing vehicle longitudinally foreshortens the trailer coupling.

BACKGROUND OF THE INVENTION

Field of the invention

Numerous previous inventors have devised "surge" brake devices which are actuable upon deceleration of the towing vehicle to apply the trailer brakes. The majority of these devices operate upon the swinging link principle wherein a coupling-supported surging link pivots upon deceleration of the towing vehicle and trips a brake actuator. A principal shortcoming of previous devices has been their mechanical complexity with resultant susceptibility to break down. Another serious deficiency of previous devices has been a lack of adequate damping means for avoiding total application of the trailer brakes upon minor variations in deceleration of the towing vehicle. For example, once the swinging links have pivoted upon deceleration of the towing vehicle there is a total application of the trailer brakes. This total application of the trailer brakes decelerates the trailer and literally holds back the towing vehicle. As a result, deceleration velocity is lessened suddenly, again causing the swinging link to pivot and totally re-apply the trailer brakes. Thus, there is a rocking action of the trailer caused by series application of the trailer brakes upon deceleration of the towing vehicle. Another shortcoming of conventional trailer couplings embodying the surge brake principle has been the frailty of support between the swinging link and the coupler main body. Many such couplings have employed a break away mechanism wherein the trailer brakes are totally applied upon uncoupling of the coupler from a towing vehicle hitch. Such break away mechanisms have for the most part been fragile and have not been operative to positively apply the trailer brakes.

DESCRIPTION OF THE PRIOR ART

Stromberg, 2,960,194; Teal, 2,642,961; Love, 2,936,048; Eksergian, 3,007,552; and Kirk et al., 3,175,649.

Stromberg, while disclosing a main body 5 with a coupler carriage 3 connected therebelow, fails to disclose refinements for:

(1) Preventing air locking and dampening out sudden swinging or pivoting of main body 5;

(2) Eliminating constant minor braking effects such as may be caused by the towing vehicle going downhill or backing up;

(3) Insuring controlled relative motion between the coupler carriage 3 and the brake actuator 20 as well as resilient biasing means for urging brake actuator 20 towards coupler carriage 3 and main body 5; and (4) Manually actuating brakes without producing undesirable relative motion between coupler carriage 3 and main body 5.

There is no structure in Stromberg corresponding to applicants' shock absorber 31, delay spring 22 and springs 21.

Teal, though discloses a spring 64 which resists the relative motion between a channel bar 12 and a pull bar 38. Teal's spring 64, however, merely precludes relative "longitudinal" movement between bars 12 and 38. That is, the problem of preventing the undesired "scissor" action between vertically aligned bodies in a trailer coupling is not even present in Teal.

Although Love discloses resilient means 110, 112 which broadly correspond to applicants' springs 21, the structural relationship of Love's springs 110, 112 to his hitch is different from that present in applicants' trailer coupling. Love's main body is below his coupling body. Thus, the weight of the towed trailer bearing on Love's main body is inclined to pull open and pivot main body and coupling and undesirably, actuate Love's surge brake.

Eksergian, though disclosing shock absorbing means 26, does not tend applicants' relationship of the use of a shock absorber with a coupler carriage rotatably mounted below the main body of the hitch.

SUMMARY OF THE INVENTION

The present coupling mechanism is distinguished by the simplicity and ruggedness of moving parts. The present coupling mechanism uniquely embodies a coupler body or arm which is linked fore and aft beneath and inwardly of a main body assembly. The main body assembly aft supports a brake actuator which engages the aft link between coupler and main body, a break away mechanism, and delay spring as well as a shock absorber damping mechanism which combinatively dampen deceleration movements to provide for gradual, positive braking action. The break away is pivoted at the rear end of the main body assembly so as to abut and thereby limit movement of the brake actuator toward the main body and coupler body. Upon breaking of the coupling between the coupler body and towing vehicle hitch and safety chain tripping of the break away mechanism, the brake actuator is thus permitted to positively apply total braking force to the trailer.

The unique linking of the coupler body beneath the main body or tongue upon which the brake actuating mechanism is supported provides a scissor-like, positive lock of the unit in non-braking position. This lock results from the opposition of downward thrust due to weight of the trailer bearing on the tongue and upward thrust due to bearing of the ball hitch in the coupler body socket.

Also, the brake actuator clevis assembly abuts a transverse link at the bottom of the aft link. Thus, direct braking application in one to one proportion of swinging of the link is achieved. There is no prior art construction which provides braking in such direct proportion to surging or swinging of the link.

DESCRIPTION OF PREFERRED EMBODIMENTS

Figure 1:
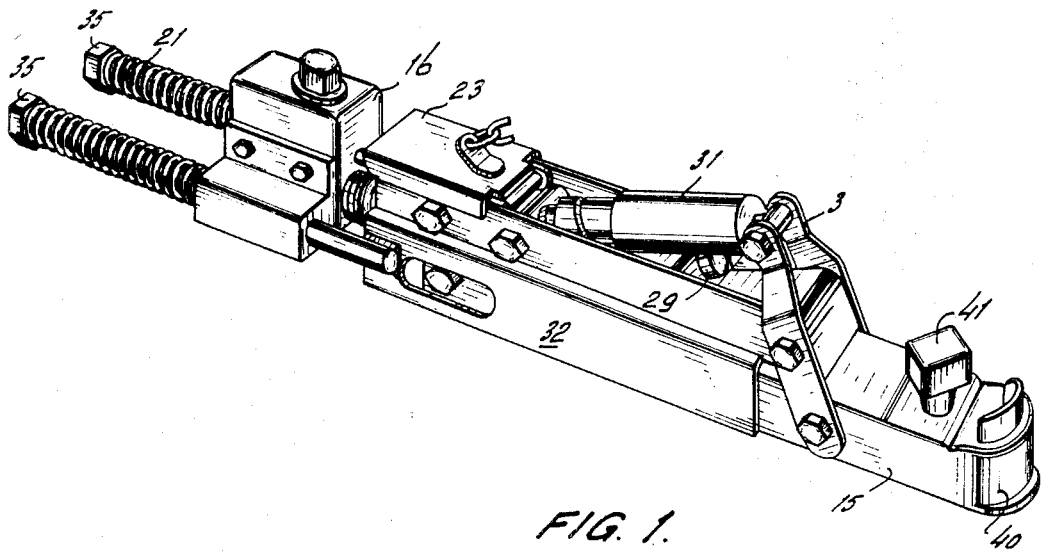
FIG. 1 is a perspective view of the coupling showing the coupler body linked beneath the main body with a brake actuator supported aft of the main body.
Figure 2:
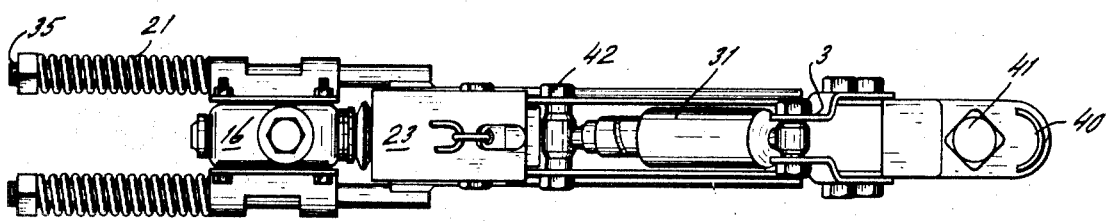
FIG. 2 is top plan thereof.
Figure 6:
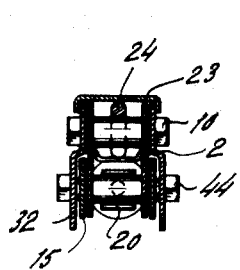
FIG. 6 is a transverse sectional view, taken along section line 6—6 of FIG. 3.
Figure 7:
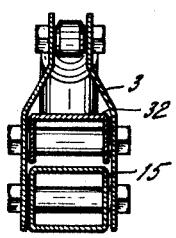
FIG. 7 is a transverse section view taken along section line 7—7 of FIG. 3.
Figure 3:
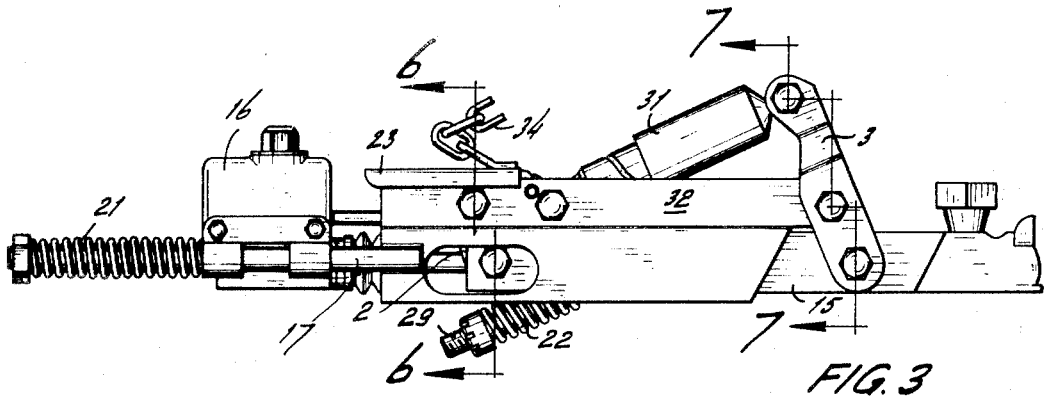
FIG. 3 is a side elevation thereof.

Coupler body 15 is shown as pivoted beneath and inwardly of main body assembly 32 by means of aft carriage link 2 and fore links 3. Brake actuator 16, which may be of the hydraulic type is supported upon carriage bolts 35 at either side of the main body 32 trailer aft end. Break away springs 21 may be mounted upon carriage bolts 35 so as to abut both aft sides of main body 32 and to urge brake actuator 16 towards main body and coupler body 15. A delay spring 22 may be mounted upon delay spring bolt 29 which extends through main body 32 and coupler body 15. Delay spring 22 is secured to the bolt 29 by means of a retainer nut or the like. Shock absorber 31 may be pivoted in main body 32 by means of transverse bolt 42. The fore end of the shock absorber 31 is attached to fore links 3 which at their bottoms, of course, are pivoted both to coupler body 15. A clevis assembly 20 extends forwardly from brake actuator 16 and engages the aft link transverse bottom limit rod 44, as illustrated in FIGS. 4 and 5.

As will be apparent, upon deceleration main body 32 pivots or swings forwardly with respect to coupler body 15. Normally, clevis 20 mounted at the end of master cylinder rod 17 is urged rearwardly by bottom limit rod 44. However, upon deceleration and forward swinging of main body 32 limit rod 44 is moved toward clevis 20, causing the trailer brakes to be applied through hydraulic brake actuator 16. This pivoting or swinging action of main body 32 with respect to coupler body 15 is dampened by means of delay spring 22 and shock absorber 31.

Figure 4:
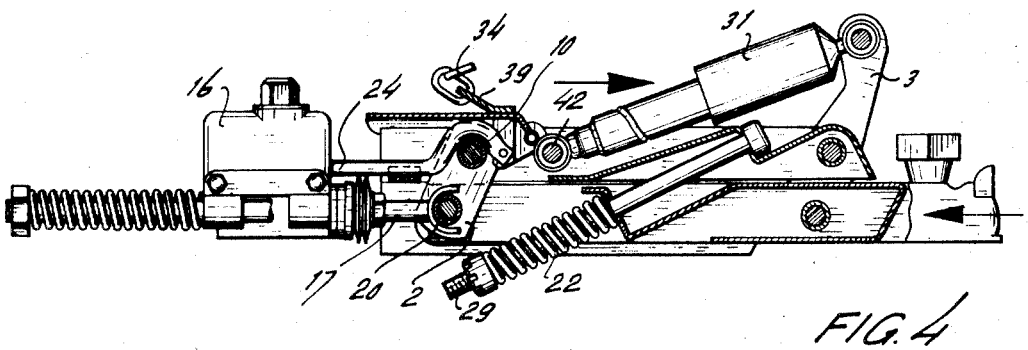
FIG. 4 is a side elevation, partially in section showing the aft link, shock absorber and delay spring mechanisms, as the coupler body swings forwardly due to towing vehicle deceleration.
Figure 5:
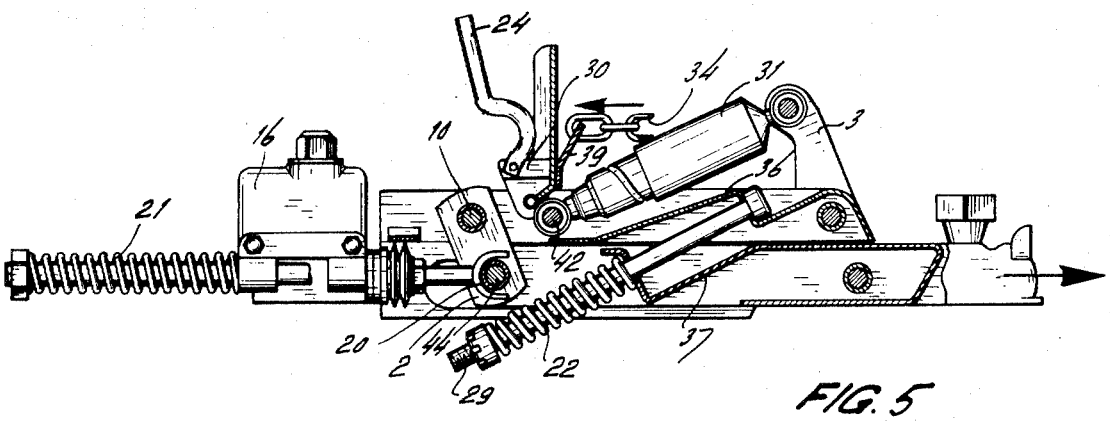
FIG. 5 is a like elevation, partially in section showing emergency application of braking upon pivoting of the brake away mechanism.

As illustrated in FIG. 4 brake away mechanism 23 embodies a housing to which is pivoted brake away push rod 24. Break away mechanism 23 is itself pivoted within the top of main body 32 by means of eccentric bracket 30. An offset portion of rod 24 rests upon aft link top bolt 10. Upon accidental decoupling of the ball socket from the trailer hitch, safety chain 34 which is attached to the towing vehicle pulls pad eye 39, thus pivoting break away housing 23 and break away push rod 24 clockwise and upwardly away from brake actuator 16. Thus, brake actuator 16 is permitted to be urged toward the main body 32 and the brakes may be correspondingly applied by virtue of being moved toward clevis 20 rear link bottom limit piece 44 supported between aft pins 2 and, therefore, effectively transversely suspended intermediate main body 32 and coupler body 15.

As indicated in FIG. 4, a cover plate 36 may be supported medially of main body 32 walls in order to serve as a dust guard or the like protecting moving elements in the shock absorber 31. A similar carriage cover plate 37 may be supported inwardly of coupler body 15 in order to protect spring 22. A conventional receiver ball socket 40 regulated by conventional turning adjuster 41 piece may be mounted on the forward end of coupler body 15 for attachment to a towing vehicle.

As will be apparent, the present coupling permits gradual, positive application of the trailer brakes in direct proportion to deceleration of the towing vehicle. The shock absorber 31 is positioned in a slanted fashion to prevent air-locking and dampens out sudden and erratic swinging or pivoting of main body 32 forces with respect to coupler body 15 so as to form each braking action into a gradual easy flowing motion. Delay spring 22 eliminates constant minor braking effects, such as in the case of the towing vehicle going downhill or backing up. Positive break away mechanism 23 when in tripped position permits break away springs 21 to steadily compress brake actuator 16 against main body 32 thus holding the trailer brakes on indefinitely. Furthermore, the superposed and abutting relationship of main body 32 and coupler body 15 tends to support the coupler in position level with the road surface and at a correct height for even, balanced towing. The longitudinal abutment of main body 32 and coupler body 15 actually provides a scissor-like positive limit to the swinging action of coupler body 15 with respect to main body 32. Coupler body 15 is suspended uniquely from the lower ends of links 2 and 3. Thus, the inherent downward pressure on the trailer tongue attached to main body 32 tends to lock main body 32 in non-braking position with respect to coupling 15, except when actual longitudinal thrust is created by the trailer overriding the decelerating towing vehicle. On the other hand, previous surge brake actuators of the swinging-link type have provided for pivoting of the coupler body *above* the main body. As a result, the inherent downward pressure on the tongue urges the main body away from the coupler body and, thus, induces longitudinal pivoting of the coupler body with respect to the main body. This longitudinal pivoting, of course, results in partial application of the trailer brakes through the brake actuator mechanism.

The positioning of the master cylinder 16 upon carriage bolts 35 which extend aft of housing 32 assures that the brake away springs 21 cannot bind against the sides of the housing as in conventional surge brake assemblies. The delay spring 21 may have a compressive strength of 100 pounds, so as to prevent swinging of the link and braking upon minor deceleration. Conventional surge brake assemblies have taught the use of a clevis intermediate the top and bottom transverse rods in an aft length. Which results at best in a one-half to one ratio of force applied to the master cylinder 17, as the aft link pivots. The present assembly provides longitudinal movement of rod 17 in direct proportion to swinging of the aft link 2. Thus, there is positive braking action directly proportional to the deceleration and swinging of the links.

We claim:

1. A trailer coupling surge brake mechanism, comprising:
   (A) a main body for attachment to a trailer, said main body having fore and aft ends and a concave underside;
   (B) a coupler body complementarily fitted within said concave underside of main body;
   (C) fore and aft pivotable link means connecting said main body and said coupler body in longitudinal abutment, said link means being pivoted to said main body at their tops and pivoted to said coupler body at their bottoms, said aft link means including at its bottom a transverse link limit rod as a point of pivot between the bottom of said aft link and said coupler body;
   (D) brake actuator means positioned apart from said aft end of said main body by means of movable rods extending away from said aft end and attached to said brake actuator;
   (E) spring means supported on and attached to said movable rods for urging said brake actuator towards said main body;
   (F) clevis means attached to and extending from said brake actuator and engaging said transverse link limit rod of said aft pivotable link means;
   (G) adjustable delay spring means attached to and extending through said main body and connected to said coupler body, said delay spring means eliminating relative motion between said main body and said coupler body caused by minor braking effects;
   (H) shock absorber means attached to and interconnecting said main body and said fore pivotable link means, said shock absorber means dampening out sudden and erratic pivoting of said main body with respect to said coupler body; and
   (I) breakaway cam means attached to and pivoted upon said main body and extending between said main body and said brake actuator limiting longitudinal movement of said brake actuator towards said main body.

2. A trailer coupling surge brake mechanism as in claim 1, said clevis being mounted upon a longitudinally actuable rod extending from said brake actuator into said coupler body.

3. A trailer coupling surge brake mechanism as in claim 2, said break away cam being pivoted in said main body tops and including:
  (i) a rod abutting said brake actuator, except when said break away cam is pivoted with respect to said main body, and
  (ii) flexible means independently extensible from said cam to the towing vehicle.

References Cited

UNITED STATES PATENTS

| 2,642,961 | 6/1953 | Teal | 188—112 |
| 2,960,194 | 11/1960 | Stromberg | 188—112 |
| 3,077,248 | 2/1963 | Wayt | 188—112 |
| 3,168,940 | 2/1965 | Ross et al. | 188—112 |
| 3,175,649 | 3/1965 | Kirk et al. | 188—112 |

GEORGE E. A. HALVOSA, Primary Examiner